United States Patent [19]

Krüger

[11] Patent Number: 5,020,487
[45] Date of Patent: Jun. 4, 1991

[54] INTERNAL COMBUSTION ENGINE WITH LOAD-RESPONSIVE VALVE CONTROL FOR COMBUSTION CHAMBER SCAVENGING

[75] Inventor: Hermann Krüger, Wolfsburg, Fed. Rep. of Germany

[73] Assignee: Volkswagen, Wolfsburg, Fed. Rep. of Germany

[21] Appl. No.: 499,890

[22] Filed: Mar. 27, 1990

[30] Foreign Application Priority Data

Apr. 26, 1989 [DE] Fed. Rep. of Germany ....... 3913706

[51] Int. Cl.$^5$ .............................................. F01L 1/34
[52] U.S. Cl. .............................. 123/90.15; 123/65 R; 123/316
[58] Field of Search ............... 123/90.15, 90.16, 90.17, 123/316, 308, 432, 65 R

[56] References Cited

U.S. PATENT DOCUMENTS

| | | | |
|---|---|---|---|
| 2,292,233 | 8/1942 | Lysholm | 123/316 |
| 2,773,490 | 12/1956 | Miller | 123/316 |
| 2,817,322 | 12/1957 | Miller | 123/316 |
| 2,936,575 | 5/1960 | Lieberherr | 123/90.16 |
| 2,997,991 | 8/1961 | Roan | 123/90.16 |
| 3,015,934 | 1/1962 | Miller | 123/316 |
| 3,496,918 | 2/1970 | Finlay | 123/90.15 |
| 3,986,351 | 10/1976 | Woods et al. | 123/90.15 |
| 4,232,641 | 11/1980 | Curtil | 123/316 |
| 4,386,587 | 6/1983 | Simko | 123/65 R |
| 4,517,934 | 5/1985 | Papez | 123/90.17 |
| 4,539,946 | 9/1985 | Hedelin | 123/316 |
| 4,651,684 | 3/1987 | Masuda et al. | 123/315 |
| 4,708,101 | 11/1987 | Hara et al. | 123/90.17 |
| 4,722,315 | 2/1988 | Pickel | 123/568 |
| 4,759,321 | 7/1988 | Matsumoto et al. | 123/90.15 |
| 4,771,742 | 9/1988 | Nelson et al. | 123/90.15 |
| 4,799,466 | 1/1989 | Shibata | 123/327 |
| 4,917,058 | 4/1990 | Nelson et al. | 123/316 |

FOREIGN PATENT DOCUMENTS 3503365 8/1985 Fed. Rep. of Germany.
3816331 12/1988 Fed. Rep. of Germany.

Primary Examiner—E. Rollins Cross
Assistant Examiner—Weilun Lo
Attorney, Agent, or Firm—Brumbaugh, Graves, Donohue & Raymond

[57] ABSTRACT

In the embodiments described in the specification, a mixture-compressing internal combustion engine has intake and exhaust valve opening and closing times arranged to permit scavenging of the combustion chamber with fresh gas and a valve control is provided to advance the intake valve closing time as a function of engine load in order to increase the compression stroke under partial load conditions. The intake valve opening time and the exhaust valve opening and closing time may also be changed in accordance with the load.

11 Claims, 3 Drawing Sheets

INTERNAL COMBUSTION ENGINE WITH LOAD-RESPONSIVE VALVE CONTROL FOR COMBUSTION CHAMBER SCAVENGING

BACKGROUND OF THE INVENTION

This invention relates to internal combustion engines having at least one intake and exhaust valves arranged to scavenge exhaust gases from the combustion chamber.

In conventional external-ignition two-stroke internal combustion engines, and sometimes in four-stroke engines as well, fresh gas, i.e., air in the case of direct fuel injection or a fuel-air mixture in the case of intake injection or carburetor engines, may be supplied during an overlap of the open phases of the inlet and outlet valve to force the exhaust formed in the combustion chamber during the previous cycle through the open outlet valve into an exhaust line. One disadvantage of this arrangement is that, with declining engine load, the volume of fresh gas delivered to the combustion chamber is reduced so that, as the engine load decreases, the exhaust content of the mixture in the combustion chamber increases, adversely affecting the rate of combustion and the completeness of combustion of the mixture in the combustion chamber.

SUMMARY OF THE INVENTION

Accordingly, it is an object of the invention to provide an internal combustion engine which overcomes the above-mentioned disadvantages of the prior art.

Another object of the invention is to provide an internal combustion engine arranged to provide scavenging in which the difficulties resulting from valve retardation relating to completeness of combustion and to lowered efficiency resulting from poor scavenging at low engine loads, are avoided or mitigated.

These and other objects of the invention are attained by providing an internal combustion engine in which the compression stroke is increased with decreasing engine load by advancing the closing time of the intake valve or—in the case of more than one intake valve—the intake valve last to close as a function of decreasing load. With this arrangement, two beneficial results are obtained. In the first place, the compression of the fuel-air mixture in combustion chamber is enhanced in that, while maintaining the same minimum size of the combustion chamber, that is, the size at top dead center in the case of a reciprocating piston engine, the compression stroke, i.e. the piston motion between closing of the last intake valve and top dead center, is enlarged with decreasing engine load. Since this enlargement results solely from change in the valve time intervals, it is possible, in the second place, for example when the intake and exhaust valve open phases are separately variable, to achieve an enlargement of the overlap of open phases of the intake and exhaust valves, that is, an enlargement of the time interval (i.e. the crank angle interval) available for scavenging.

In certain embodiments specific conventional designs, for example the adjustable cam flanks disclosed in U.S. Pat. No. 4,517,934 and the angular adjustment of cam* or camshafts disclosed in U.S. Pat. No. 3,496,918, which are incorporated by reference herein, may be employed to vary the valve intervals as a function of load according to the invention. The patent first named describes, in principle, a camshaft consisting of an inner shaft and a hollow shaft accommodating it, the two shafts bearing rotationally fixed at least partial cams, of which those borne by the inner shaft traverse openings in the hollow shaft with clearance, so that, upon relative rotation of the two shafts, a change in cam length, i.e., a change in location of the cam flanks in relation to each other, occurs. This relative rotation may be produced by electrical load signals according to the patent disclosure. For angular variation between intake and exhaust camshafts, as described in U.S. Pat. No. 3,496,918, the lengths of the taut and the slack sides of a gear belt engaging sprockets on the crankshaft of the engine and on the intake and exhaust valve camshafts are varied as a function of load signals. Since such designs are disclosed in these patents, they will not be described in detail here. While such designs are, per se, quite well known to those skilled in the art, the use of such designs to increase the compression stroke with decreasing load to provide improved performance with scavenging is novel.

Before describing representative embodiments of the invention by way of example with reference to the drawings, it should be mentioned that the measures provided according to the invention for reducing or eliminating the disadvantages resulting from the inherent variation of scavenging as a function of load may possibly affect the load control of the engine, which may be effected by timing variation, such as an intake control. This may be compensated in accordance with the invention by varying the fresh gas pressure at the intake valve.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

In the schematic valve control diagrams shown in FIGS. 1 to 6, the crank angle of a reciprocating piston in an internal combustion engine has a top dead center position of the piston, designated OT, in the corresponding engine cylinder. The diagrams also show the time period, or crank angle, $E_ö$ of intake valve opening, the time $E_s$ of closing of the intake valve, and the time period, or crank angle, $A_ö$ of exhaust valve opening and the time of closing $A_s$ of the exhaust valve. If the cylinder has a combustion chamber with several intake valves, the invention requires that at least the inlet valve which opens last in the direction of the arrows should have the opening times depicted in FIGS. 1 and 2 and if the cylinder has several exhaust valves, any control of an exhaust valve according to the invention should relate at least to the exhaust valve which opens first in the cycle.

Figure 1:
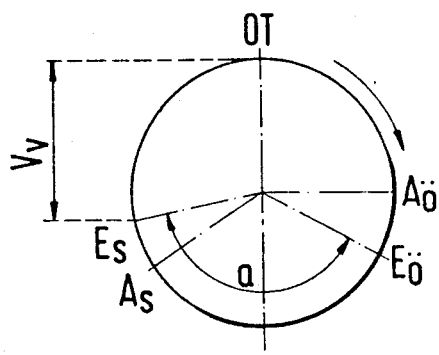
FIG. 1 is a schematic valve control diagram showing the intake and exhaust valve opening and closing crank angles for the full load condition in one embodiment of the invention.
Figure 2:
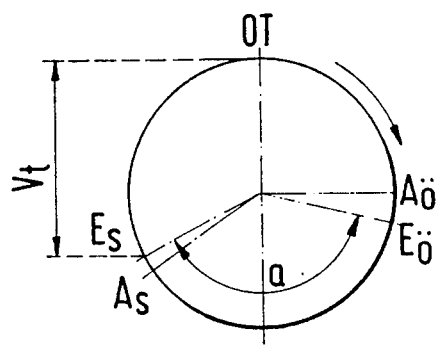
FIG. 2 is a diagram similar to that of FIG. 1 showing the intake and exhaust valve opening and closing angles for the embodiment of FIG. 1 in the partial load condition.

In the embodiment depicted schematically in FIGS. 1 and 2, the compression stroke is increased from the quantity $V_v$ in the full load condition shown in FIG. 1 to the quantity $V_t$ in the partial-load condition of the engine shown in FIG. 2. This is done while maintaining a constant intake open phase angle a by advancing the intake valve opening and closing time $E_ö$ and $E_s$ so that the overlap of the open phases of the intake and exhaust valves is increased at the same time. Accordingly, the term "compression stroke" as used herein means that part of the piston motion, in terms of crank angle, which takes place between closure of the combustion chamber due to closing of all of the valves and the top-dead-center position of the piston. The last valve to be closed is the intake valve which closes at the time designated $E_s$.

To control the variations in intake and exhaust valve opening and closing times in accordance with the diagrams shown in FIGS. 1 and 2, any conventional valve control arrangement responsive to load conditions may be used. For example, control of the variation in times of the intake valve may be realized by the arrangement disclosed in the above-mentioned U.S. Pat. No. 3,496,918 and if control of variation of the exhaust valve opening and closing times is also provided, an additional rigid camshaft must be used.

Figure 3:
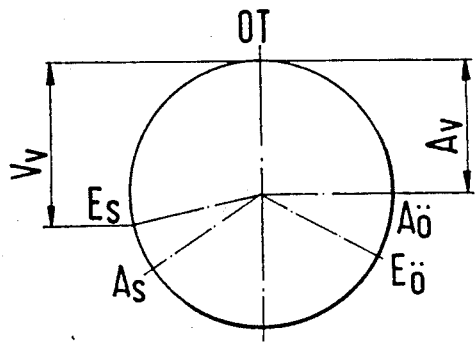
FIGS. 3 and 4 are diagrams similar to those of FIGS. 1 and 2 for a second embodiment of the invention.
Figure 4:
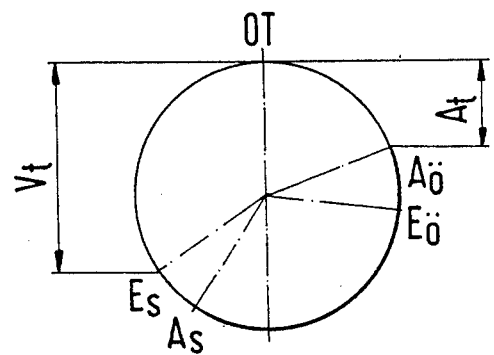

This need to provide two camshafts is dispensed with in the embodiment of FIGS. 3 and 4 wherein FIG. 3 again shows the control times for full-load operation and FIG. 4 those for partial-load operation. In addition to the information shown in the diagrams of FIGS. 1 and 2, FIGS. 3 and 4 additionally show the power stroke $A_v$ at full load and $A_t$ at partial load. As used herein, the term "power stroke" is the motion of the piston, in terms of crank angle, between its top-dead-center position and the opening of the first exhaust valve. In this embodiment, the opening and closing of both the intake and the exhaust valves are advanced at partial load relative to the situation at full load. This produces not only an increase of the compression stroke from the quantity $V_v$ to the quantity $V_t$ but also a reduction of the power stroke from the quantity $A_v$ to the quantity $A_t$. If these shifts in control times of the two valves are equal, a single rigid camshaft having a drive mechanism corresponding to that of U.S. Pat. No. 3,496,918 may be employed to actuate both valves. If the shifts in the control times of the two valves are in the same direction but are different in magnitude, separate camshafts for intake and exhaust valves may be used, each of which may have the same kind of driving arrangement.

Figure 5:
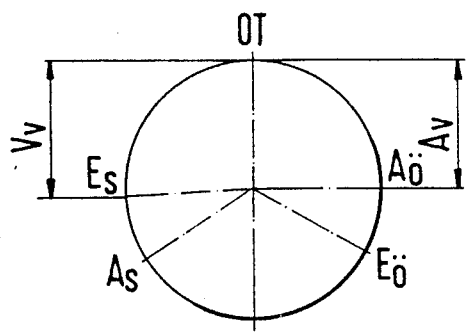
FIGS. 5 and 6 are diagrams similar to those of FIGS. 1 and 2 for a third embodiment of the invention.
Figure 6:
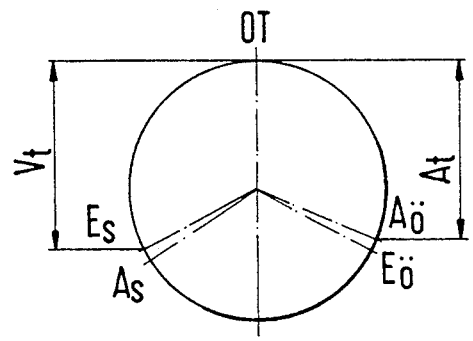

Whereas in the embodiment of FIGS. 3 and 4 the compression stroke is increased but the power stroke is reduced, FIGS. 5 and 6 show an embodiment in which both the compression stroke and the power stroke are increased, the former from a quantity $V_v$ at full load to a quantity $V_t$ at partial load, and the latter from a quantity $A_v$ at full load to a quantity $A_t$ at partial load. In this case, two camshafts must be employed to control the inlet and outlet valves, each driven for example by an arrangement of the type described in the above-mentioned U.S. patent, except that the shifts must take place in different directions. It will be seen that, in this embodiment of the invention, besides an increase of the stroke, there will also be an increase in the overlap of inlet and outlet valve open phases.

It is also possible to advance only the intake valve closing time $E_s$ as a function of load, leaving all other valve control times unchanged. This may be accomplished by a change in the intake valve cam length, or the position of its terminal flank with respect to the initial flank, which may be brought about, for example, by the arrangement described in U.S. Pat. No. 4,517,934.

Figure 7:
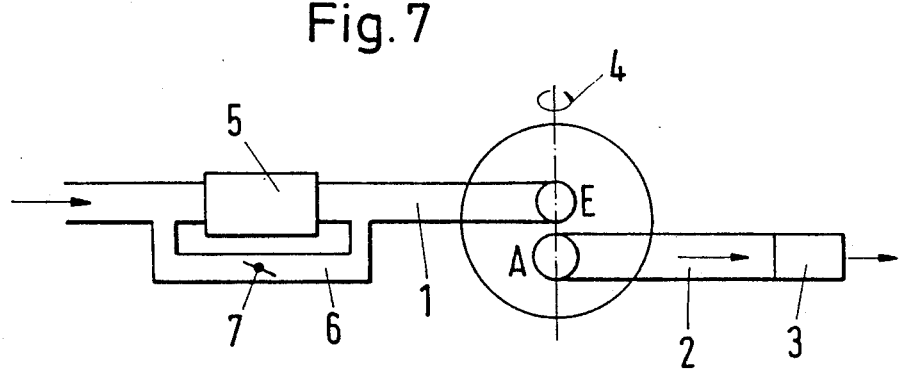
FIG. 7 is a schematic block diagram showing a representative arrangement for controlling engine load for one cylinder of an engine arranged according to the invention.

FIG. 7 illustrates schematically a top view of the cylinder of an internal combustion engine arranged according to the invention. In this embodiment, the cylinder has only one intake valve E and only one exhaust valve A. The intake valve E is connected to an intake passage 1 while the exhaust valve is connected to an exhaust passage 2 containing a catalytic converter 3. The directions of flow through these passages are indicated by arrows. The variation in crank angle control times of the above-described valves E and A according to the invention is schematically depicted by the arrow 4.

The inlet passage 1 includes an air delivery device 5 such as a pump, and is provided with a by-pass duct 6 having a throttling flap 7 which is adjustable as a function of the engine load. By moving the flap 7 the pressure at the intake valve E may be varied for control in accordance to engine load.

Figure 9:
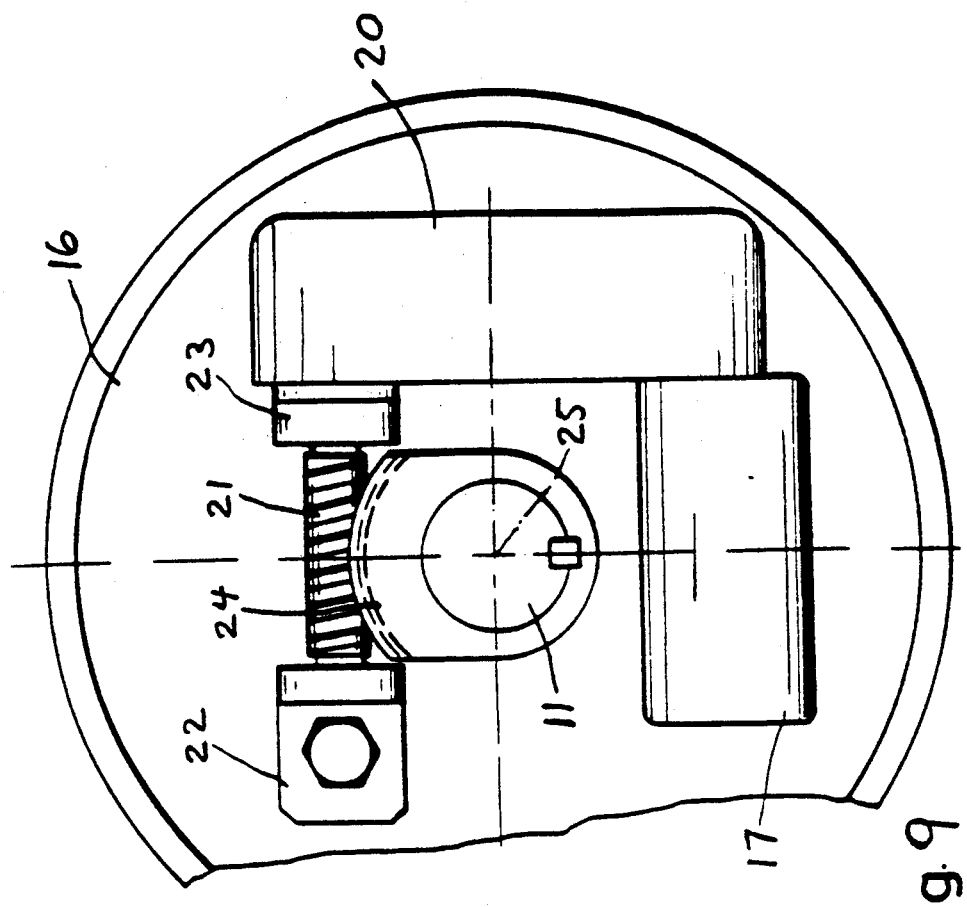
FIG. 9 is a front view, also in schematic form of the arrangement illustrated in FIG. 8.
Figure 8:
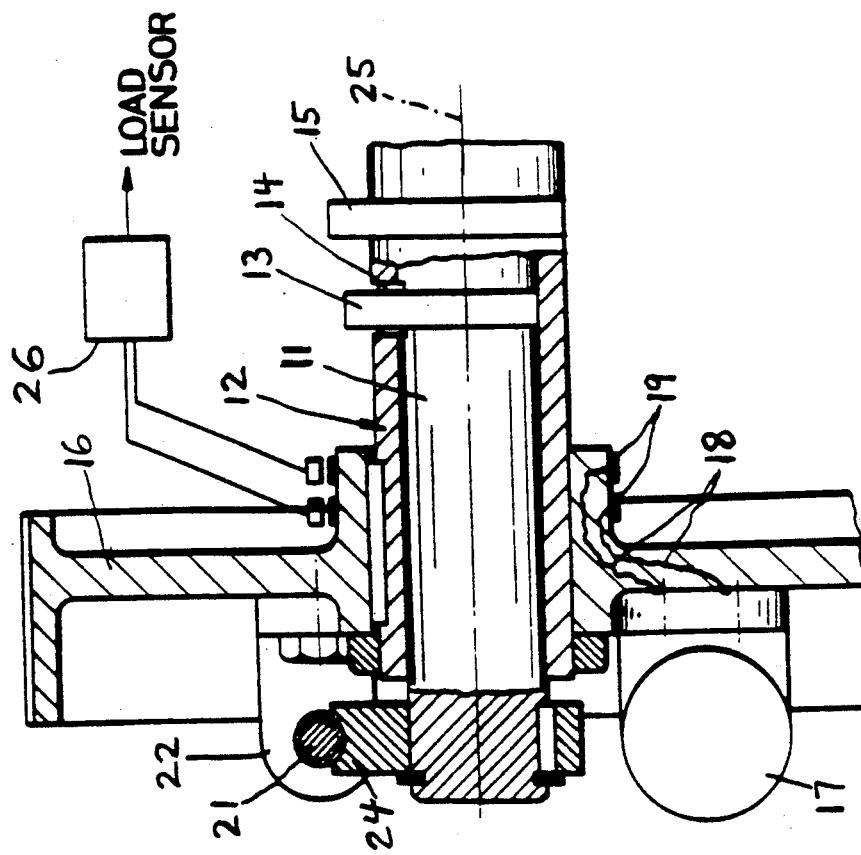
FIG. 8 is a longitudinal section view, in schematic form, showing an arrangement for varying valve opening and closing angles by changing the angel between the opening and closing flanks of a valve control cam.

The variations in crank angle control times schematically depicted by the arrow 4 in FIG. 7 may be accomplished by the arrangement illustrated in FIGS. 8 and 9. In this arrangement, an inner shaft 11 is concentrically surrounded by a hollow outer shaft 12. The shafts 11 and 12 form the camshaft arrangement proper. A cam portion 13, rigidly connected to the inner shaft 11, passes through an opening 14 in the outer shaft 12. The outer hollow shaft 12 in turn carries a rigidly affixed cam portion 15. The cam portions 13 and 15 are positioned to engage a cam follower acting on the exhaust valve for the exhaust port E in FIG. 7, for example, so that, when either of the cam surfaces 13 and 15 engages the follower, the valve is opened. In this manner, the two partial cams combine to act as a compound cam which, through relative pivoting between the inner shaft 11 and the outer shaft 12, provides variable cam length.

The camshaft is driven by a camshaft timing gear 16 which, in the embodiment of FIGS. 8 and 9, is fixedly attached on the hollow outer shaft 12. The camshaft timing gear 16 is driven in a conventional manner by a timing belt or toothed gear from the internal combustion engine proper and is synchronized with the camshaft rotation.

The camshaft timing gear 16 carries at its left end in the orientation shown in FIG. 8 an electric motor 17. The motor 17 is connected electrically by way of wires 18 and slip rings 19 with stationary sliding contacts cooperating with the slip rings 19. The sliding contacts in turn are connected with any suitable electronic controlling device 26 which emits electric control signals for driving the electric motor 17 in response to the engine load. Accordingly, the signals cause the motor to rotate clockwise or counterclockwise, dependent upon the adjustment of the cam portions required to produce the above-described changes in valve operating time.

The electric motor 17 drives a threaded spindle 21 by way of gearing 20. The spindle 21 is supported by bearing blocks 22 and 23 on the end face of the camshaft timing gear 16. The threaded spindle 21, in turn, means with a threaded gear segment 24 which is rotatable about the axis 25 of the camshafts 11 and 12.

The invention thus provides an internal combustion engine with fresh gas scavenging of the combustion chamber in which the disadvantages, as to combustion and partial-load efficiency, resulting from the inherent variation of combustion chamber scavenging with fresh gas as a function of load, are reduced or eliminated.

Although the invention has been described herein with reference to specific embodiments, many modifications and variations therein will readily occur to those skilled in the art. Accordingly, all such variations and modifications are included with the intended scope of the invention.

I claim:

1. An internal combustion engine comprising a cylinder having a combustion chamber and a piston movable in the cylinder, at least one intake valve communicating with the combustion chamber, at least one exhaust valve communicating with the combustion chamber, wherein the opening phases of the intake valve and the exhaust valve overlap at the bottom dead center position to permit combustion chamber scavenging with fresh gas, and wherein the compression stroke is defined by the closing time of the intake valve or the intake valve last to close, respectively, and the top-dead-center position of the piston and the power stroke is defined by the top-dead-center position of the piston and the opening time of the exhaust valve or the exhaust valve first to open, respectively, and valve control means for increasing the compression stroke with decreasing engine load by advancing the closing time of the intake valve or at least the intake valve last to close, respectively, as a function of load.

2. An internal combustion engine according to claim 1 wherein the valve control means includes means for advancing the opening and closing times of the intake and exhaust valves equally as a function of load.

3. An internal combustion engine according to claim 2 wherein the valve control means include a rigid camshaft having a rotary drive means and a cam angle-adjusting drive means responsive to signals representing engine load.

4. An internal combustion engine according to claim 1 wherein the valve control means includes means for advancing the opening time of only the intake valve or at least the intake valve last to close, respectively, as a function of load.

5. An internal combustion engine according to claim 4 wherein the intake valve or at least the intake valve last to close, respectively, is actuated by a rigid camshaft having a rotary drive means and a cam angle-adjusting drive means responsive to signals representing engine load.

6. An internal combustion engine according to claim 1 wherein the valve control means includes means for advancing only the closing time of the intake valve or at least the intake valve last to close, respectively, as a function of load.

7. An internal combustion engine according to claim 6 wherein the intake valve or at least the intake valve last to close, respectively, is actuated by a camshaft having an opening cam with a terminal flank which is movable in the direction of cam rotation relative to the initial flank by means of an angle-adjusting drive means responsive to signals representing engine load.

8. An internal combustion engine according to claim 1 wherein the valve control means includes means for increasing the power stroke with decreasing engine load by retarding the opening time of the exhaust valve or at least the exhaust valve first to open, respectively, as a function of load.

9. An internal combustion engine according to claim 8 wherein the exhaust valve or at least the exhaust valve first to open, respectively, is actuated by a rigid camshaft having a rotary drive means and a cam angle-adjusting drive means responsive to signals representing engine load.

10. An internal combustion engine according to claim 1 including means for varying the pressure of fresh gas supplied to the intake valve for control in accordance to engine load.

11. An internal combustion engine according to claim 10 including an intake conduit having an air pump connected to the intake valve and a by-pass duct bypassing the air pump containing a throttle actuated in accordance with engine load.

* * * * *